United States Patent
Horng et al.

(10) Patent No.: US 6,838,849 B2
(45) Date of Patent: Jan. 4, 2005

(54) SERIALLY CONNECTED DOUBLE-PHASE FULL-WAVE BRUSHLESS DC MOTOR

(75) Inventors: Alex Horng, Kaohsiung (TW); Ching-Sheng Hong, Kaohsiung (TW); Ta-Lun Ko, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/638,435

(22) Filed: Aug. 12, 2003

(65) Prior Publication Data

US 2004/0239273 A1 Dec. 2, 2004

(30) Foreign Application Priority Data

May 27, 2003 (TW) .......................................... 92114290

(51) Int. Cl.[7] .............................. H02P 5/06; H02P 7/06; H02K 23/00
(52) U.S. Cl. ........................ 318/439; 318/254; 318/594; 318/602
(58) Field of Search .................................. 318/254, 439, 318/594, 600–605, 93, 95, 111–113

(56) References Cited

U.S. PATENT DOCUMENTS

| | | | | |
|---|---|---|---|---|
| 4,455,515 A | * | 6/1984 | Uzuka | 318/254 |
| 4,692,674 A | * | 9/1987 | Packard et al. | 318/254 |
| 4,720,663 A | * | 1/1988 | Welch et al. | 318/254 |

* cited by examiner

*Primary Examiner*—David Martin
*Assistant Examiner*—Patrick Miller
(74) *Attorney, Agent, or Firm*—Bacon & Thomas, PLLC

(57) ABSTRACT

A serially connected double-phase full-wave brushless dc motor includes a first drive member, a second drive member, a first sensor member, a second sensor member, a first motor coil and a second motor coil. The first drive member is connected to a power source to thereby obtain a first voltage, and connected to the first sensor member and the first motor coil. The first drive member is further in serial connection with a second drive member and a second sensor member, and provides with a second voltage thereto. The second drive member is connected to the second sensor member and the second motor coil. Hall signals of the first and second sensor members are in control of an alternative direction of the first and second motor coils for conduction, and thereby the first and second motor coils are synchronously excited in full wave by the first and second voltages respectively.

6 Claims, 4 Drawing Sheets

SERIALLY CONNECTED DOUBLE-PHASE FULL-WAVE BRUSHLESS DC MOTOR

BACKGROUND OF THE INVENTION

1. Field of the Invention

The present invention is related to a serially connected double-phase full-wave brushless dc motor. More particularly, the present invention is related to two sensor/drive members used to control a serially connected type of the double-phase full-wave brushless dc motor.

2. Description of the Related Art

Referring initially to FIG. 1, it illustrates a schematic circuitry of a conventional single-phase full-wave brushless dc motor. The single-phase full-wave brushless dc motor in accordance with the prior art has a drive circuit 10 for driving a single-phase full-wave coil assembly. The drive circuit 10 includes a drive member 11, a sensor member 12 and a motor coil 13. The drive member 11 is electrically connected to the sensor member 12 and the motor coil, thereby Hall sensors detected by the sensor member 12 controlling current directions of the motor coil 13. In two-way directions, the excited motor coil 13 is capable of rotating a motor rotor by full-wave manner.

However, the rated power and voltage characteristic of the drive member 11 is changed nonlinear with respect to its dimensions. In other words, if the rated power of the drive member 11 is doubled, the dimensions have an increase of more than double. Thus, the increase of the rated power of the drive member 11 must result in an extra-occupation in an inner space of the motor.

Moreover, a large rated power of the drive member 11 must result in an increase of manufacturing cost. That is, the manufacturing cost of a double rated power of the drive member 11 must be more expensive than that of two regular rated power of the drive member 11.

In order to save the inner space and to reduce manufacturing cost of the motor, an additional drive member is added into the motor. Consequently, the motor accomplishes a double increase in rated power and a reduction in manufacturing cost. Meanwhile, the single-phase full-wave motor coil is divided into a pair of double-phase full-wave motor coils which are suitable for two drive members. In manufacture, the total dimensions of the two double-phase full-wave motor coils are substantially identical with that of the single-phase full-wave motor coil so that the entire dimensions of the motor coil may not be increased and the loop count of the motor coil may not be reduced.

The present invention intends to provide a double-phase full-wave brushless dc motor having two drive members for controlling a serially connected type of a double-phase full-wave coil assembly, each of the drive members provided with a small rated power. The serially connected type of the double-phase full-wave coil assembly substitutes a single-phase full-wave motor coil. Due to the small dimensions and the low manufacturing cost, the small rated power of the drive members substitute for a large rated power of the drive member that may enhance the rated power, minimize the dimensions and reduce the manufacturing cost. In manufacture, maximum number of the drive members of the motor is equal to or less than number of poles according to design choice.

SUMMARY OF THE INVENTION

The primary objective of this invention is to provide a serially connected double-phase full-wave brushless dc motor, which includes two drive members, each of which has small rated power adapted to control a serially connected type of a double-phase full-wave coil assembly. Thereby, the two drive members may enhance the rated power of the double-phase full-wave brushless dc motor.

The secondary objective of this invention is to provide the serially connected double-phase full-wave brushless dc motor, which includes two drive members that accomplishes small dimensions and low manufacturing cost. Thereby, the two drive members may minimum the dimensions and lower the manufacturing cost of the double-phase full-wave brushless dc motor.

The double-phase full-wave brushless dc motor in accordance with the present invention includes a first drive member, a second drive member, a first sensor member, a second sensor member, a first motor coil and a second motor coil. The first drive member is connected to a power source to thereby obtain a first voltage, and connected to the first sensor member and the first motor coil. The first drive member is further in serial connection with a second drive member and a second sensor member, and provides with a second voltage thereto. A Hall signal of the first sensor member is in control of an alternative direction of the first motor coil for conduction, and thereby the first motor coil is excited in full wave by the first voltage. Meanwhile, the second drive member is connected to the second sensor member and the second motor coil. A Hall signal of the second sensor member is in control of an alternative direction of the second motor coil for conduction, and thereby the second motor coil is excited in full wave by the second voltage. In operation, the first motor coil and the second coil are excited synchronous due to the serial connection of the first motor coil and the second motor coil.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
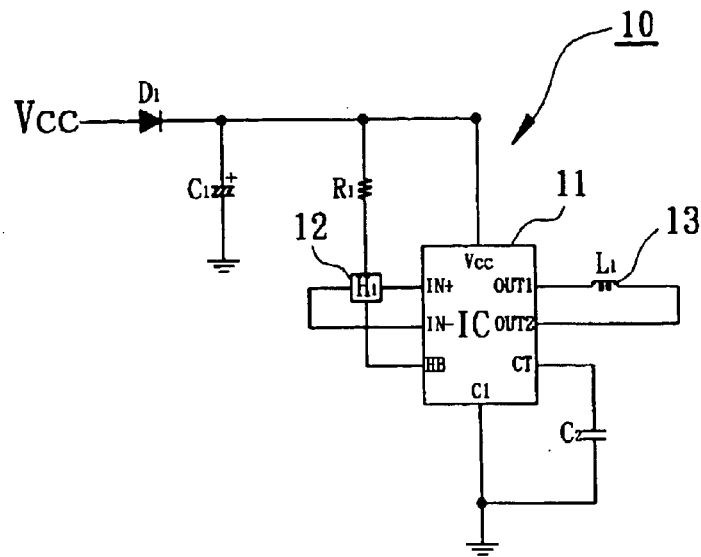
FIG. 1 is a schematic circuitry of a conventional single-phase full-wave brushless dc motor in accordance with the prior art.

Referring now to the drawings, there are four embodiments of the present invention shown therein, which include generally drive members, sensor members and motor coils.

Figure 2:
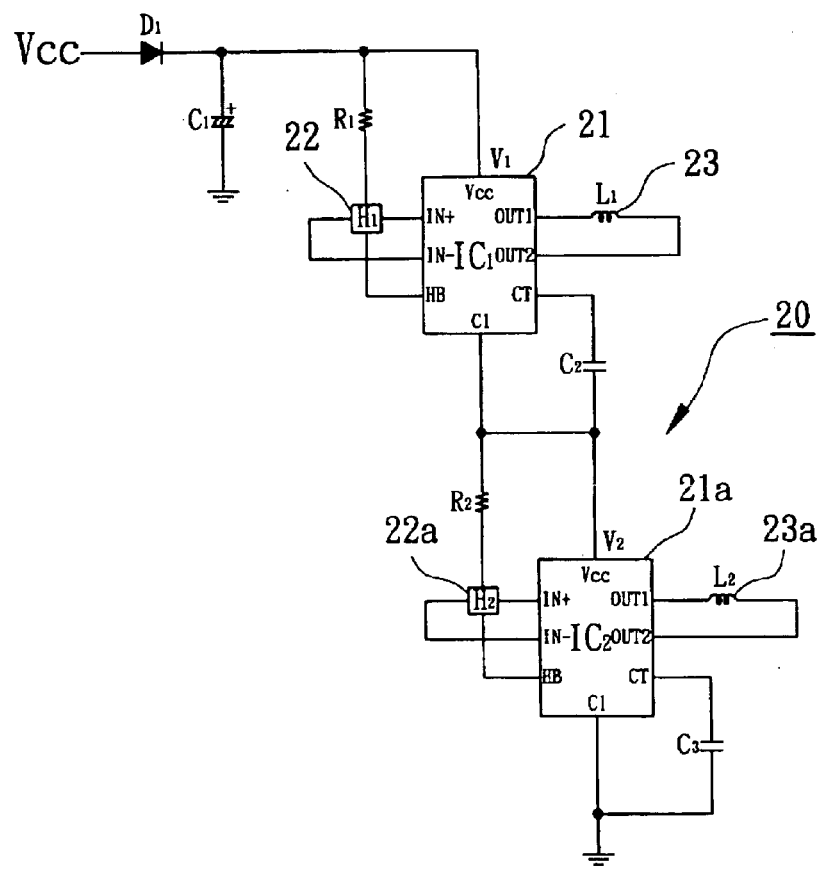
FIG. 2 is a schematic circuitry of a double-phase full-wave brushless dc motor in accordance with a first embodiment of the present invention.
Figure 3:
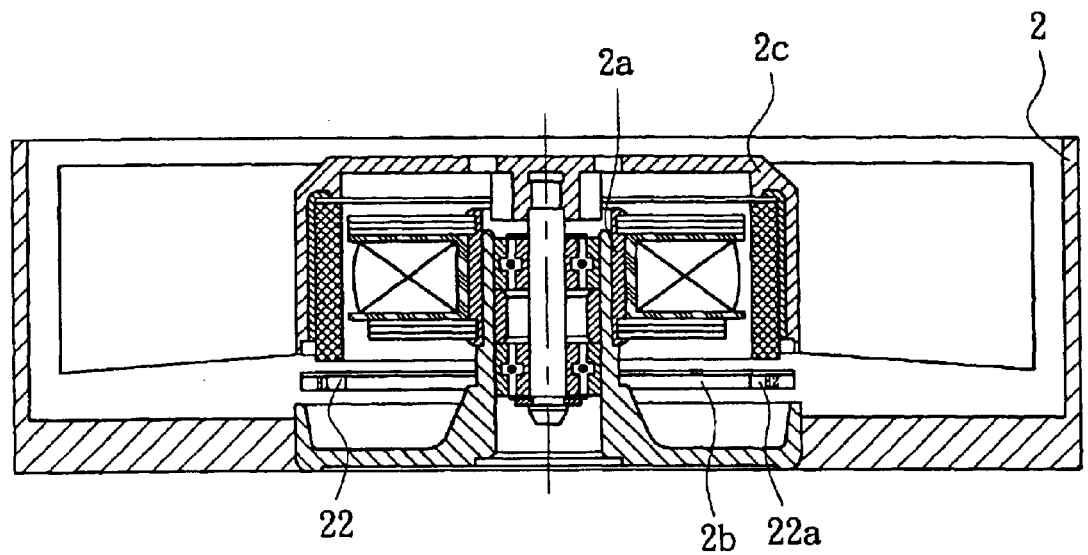
FIG. 3 is a cross-sectional view of the double-phase full-wave brushless dc motor in accordance with the first embodiment of the present invention.

FIG. 2 illustrates a schematic circuitry of a double-phase full-wave brushless dc motor having two drive members and two sensor members in accordance with a first embodiment of the present invention. FIG. 3 illustrates a cross-sectional view of a circuit board of the double-phase full-wave brushless dc motor mounting two sensor members in accordance with the first embodiment of the present invention.

Referring to FIGS. 2 and 3, a serially connected double-phase full-wave brushless dc motor 2 in accordance with the first embodiment of the present invention has a serially connected drive circuit 20 for driving a double-phase full-wave coil assembly. The serially connected drive circuit 20 includes a first drive member 21, a second drive member 21a, a first sensor member 22, a second sensor member 22a, a first motor coil 23 and a second motor coil 23a.

Construction of the serially connected drive circuit 20 of the double-phase full-wave brushless dc motor shall be described in detail, referring back to FIG. 2. Preferably, the rated power of the first drive member 21 is relatively small, and identical with that of the second drive member 21a. Also preferably, the impedance of the first motor coil 23 is further identical with that of the second motor coil 23a which is serially connected to the first motor coil 23. Furthermore, the first drive member 21 is serially connected to the second drive member 21a to thereby constitute the serially connected drive circuit 20.

Referring back to FIG. 3, the double-phase full-wave brushless dc motor includes a motor stator 2a, a circuit board 2b mounted to a bottom of the motor stator 2a, and a motor rotor 2c. In manufacturing, the first motor coil 23 and the second motor coil 23a are commonly wound to constitute a double-phase coil assembly. The serially connected drive circuit (not shown) is disposed and incorporated into the circuit board 2b which is adapted to mount the first drive member 21, the second drive member 21a, a first sensor member 22 and a second sensor member 22a. In operation, the first sensor member 22 and the second sensor member 22a are able to detect a rotation of a permanent magnet of the motor rotor 2c, and thus send Hall signals to the first drive member 21 and the second drive member 21a respectively.

Referring again to FIG. 3, in assembling, on the circuit board 2b, the first sensor member 22 and the second sensor member 22a are chosen to locate at various positions on the circuit board 2b for detecting the magnetic phase of the motor rotor 2c. And in rotational operation, the first sensor member 22 may detect a magnetic phase of 0 degrees, 90 degrees, 180 degrees or 270 degrees of the motor rotor 2c leading to that detected by the second sensor member 22a.

Referring back to FIG. 2, the detected magnetic phase of the first sensor member 22 is designated 0 degrees or 180 degrees leading to that of the second sensor member 22a. Two pins OUT1 and OUT2 of the first drive member 21 are arranged corresponding to two pins OUT1 and OUT2 of the second drive member 21a so as to allow the first motor coil 23 and the second motor coil 23a to be conducted in the same directions. Thereby, the first motor coil 23 and the second motor coil 23a are excited in same direction to drive the motor rotor 2c.

Referring again to FIG. 2, the first drive member 21 is connected with a power source (Vcc) to thereby obtain a first voltage V1. The first drive member 21 is connected to the first sensor member 22 and the first motor coil 23, and thus Hall signals detected by the first sensor member 22 are adapted to supply to the first drive member 21 that a conductive direction of the first motor coil 23 is controlled. Thereby, the first motor coil 23 is excited in full wave by the first voltage V1 to thereby generate a full-wave magnetic field. Meanwhile, the first drive member 21 is supplied with a second voltage V2 to the second drive member 21a. The second drive member 21a is connected to the second sensor member 22a and the second motor coil 23a, and thus Hall signals detected by the second sensor member 22a are adapted to supply to the second drive member 21a that a conductive direction of the second motor coil 23a is controlled. Thereby, the second motor coil 23a is excited in full wave by the second voltage V2 to thereby generate a full-wave magnetic field. Consequently, the first voltage V1 and the second voltage V2 supplied from the power source (Vcc) are passed through the serially connected drive circuit 20 for exciting a double-phase full-wave coil assembly of the first motor coil 23 and the second motor coil 23a.

In rotational operation, the first sensor member 22 and the second sensor member 22a are adapted to detect the same pole phase (N pole or S pole) of the permanent magnet of the motor rotor 2c synchronously. Thereby, the first drive member 21 and the second drive member 21a may decide alternative directions of current passing through the first motor coil 23 and the second motor coil 23a so that the first motor coil 23 and the second motor coil 23a are alternatively excited in fill wave.

When the first motor coil 23 and the second motor coil 23a are synchronously conducted in full wave, the first voltage V1 and the second voltage V2 are supplied to the first drive member 21 and the second drive member 21a that may result in an increase of rated power. For example, if a single-phase full-wave brushless dc motor has 500 mW rated power and 12V rated voltage, and the double-phase full-wave brushless dc motor of the present invention is brought up to 1000 mW rated power and 24 V rated voltage.

Referring again to FIGS. 1 and 2, to increase rated power of the motor, the conventional drive circuit 10 of the conventional single-phase full-wave brushless dc motor must use a large, expensive drive member 11 that may result in an increase of dimensions and manufacturing cost. By contrast, the serially connected drive circuit 20 of the present invention applies a small drive member 21 and an additional small drive member 21a to increase total rated power that may result in a reduction of dimensions and manufacturing cost.

Figure 4:
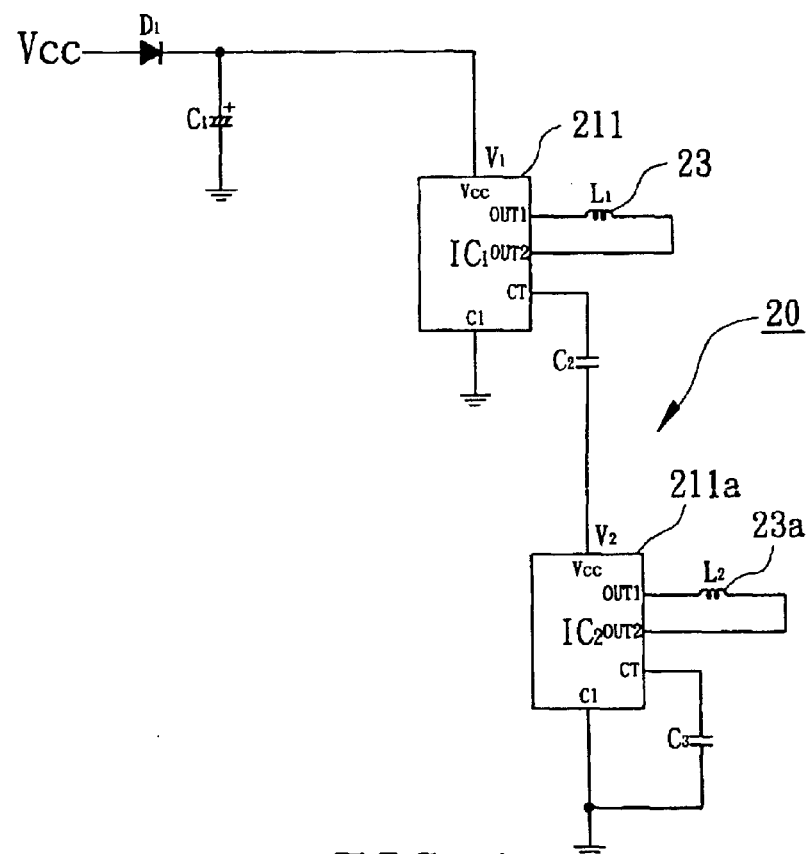
FIG. 4 is a schematic circuitry of a double-phase full-wave brushless dc motor in accordance with a second embodiment of the present invention.

FIG. 4 illustrates a schematic circuitry of a double-phase full-wave brushless dc motor having two sensor/drive members in accordance with a second embodiment of the present invention.

Referring to FIG. 4, reference numerals of the second embodiment has applied the identical numerals of the first embodiment. The double-phase full-wave brushless dc motor of the second embodiment has the similar configuration and same function as that of the first embodiment and the detailed descriptions are omitted.

Referring to FIG. 4, the serially connected drive circuit 20 in accordance with the second embodiment includes a first sensor/drive member 211, a second sensor/drive member 211a, a first motor coil 23 and a second motor coil 23a.

In comparison with the first embodiment, incorporating a sensor member into a drive member constitutes each of the sensor/drive members 211 and 211a of the second embodiment.

Figure 5:
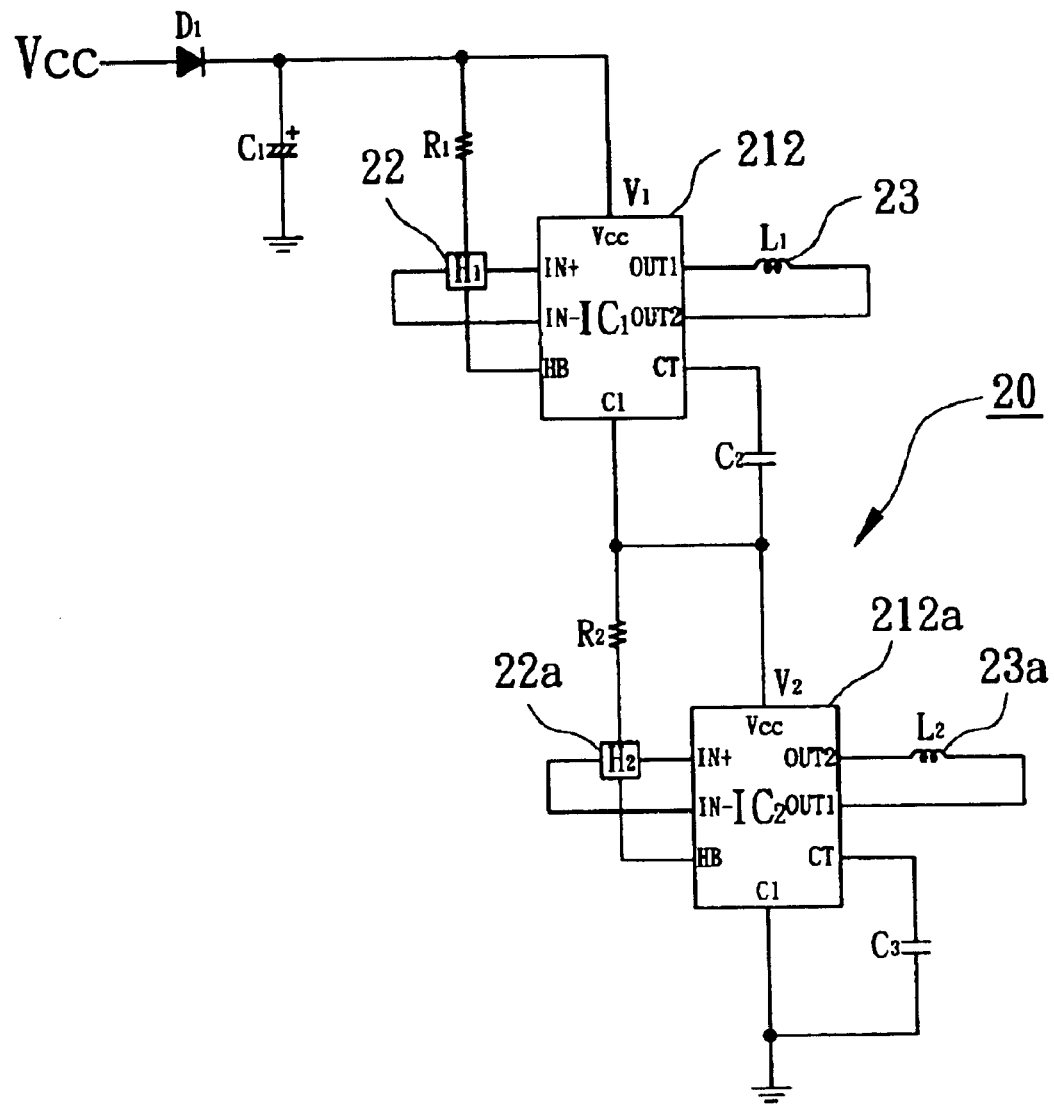
FIG. 5 is a schematic circuitry of a double-phase full-wave brushless dc motor in accordance with a third embodiment of the present invention.

FIG. 5 illustrates a schematic circuitry of a double-phase full-wave brushless dc motor having two drive members and two sensor members in accordance with a third embodiment of the present invention.

Referring to FIG. 5, reference numerals of the third embodiment has applied the identical numerals of the first embodiment. The double-phase full-wave brushless dc motor of the third embodiment has the similar configuration and same function as that of the first embodiment and the detailed descriptions are omitted.

Referring to FIG. 5, the detected magnetic phase of the first sensor member 22 in accordance with the third embodiment is designated 90 degrees or 270 degrees leading to that of the second sensor member 22a. In comparison with the first embodiment, a connected relationship of the second drive member 212a with the second motor coil 23a of the third embodiment is opposite to that of the first drive member 212 with the first motor coil 23. Namely, two pins OUT1 and OUT2 of the first drive member 212 are arranged opposite to two pins OUT1 and OUT2 of the second drive member 212a so as to allow the first motor coil 23 and the second motor coil 23a to be conducted in the opposite direction. Thereby, the first motor coil 23 and the second motor coil 23a are excited in opposite direction to drive the motor rotor 2c.

Figure 6:
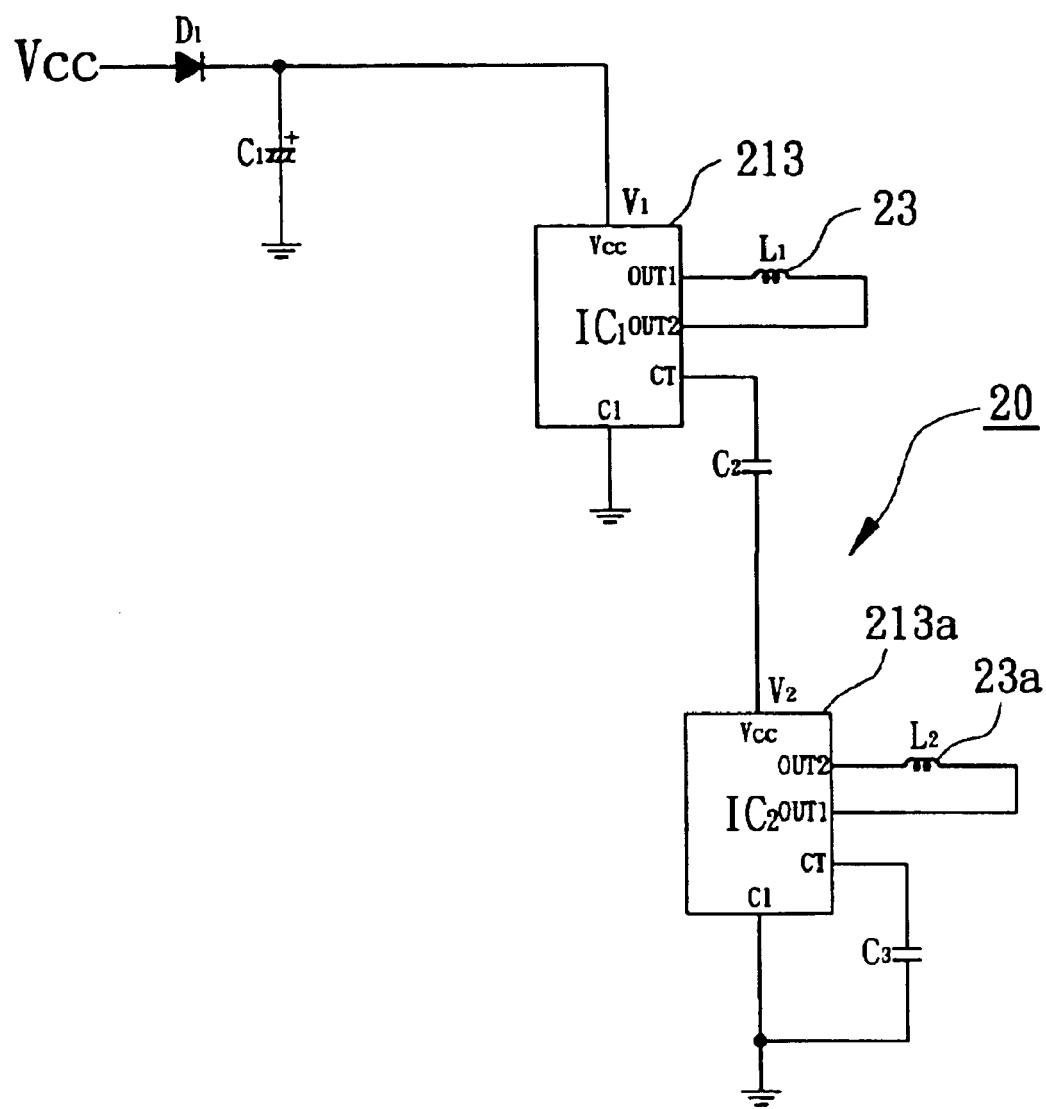
FIG. 6 is a schematic circuitry of a double-phase full-wave brushless dc motor in accordance with a fourth embodiment of the present invention.

FIG. 6 illustrates a schematic circuitry of a double-phase full-wave brushless dc motor having two sensor/drive members in accordance with a fourth embodiment of the present invention.

Referring to FIG. 6, reference numerals of the fourth embodiment has applied the identical numerals of the third embodiment. The double-phase full-wave brushless dc motor of the fourth embodiment has the similar configuration and same function as that of the third embodiment and the detailed descriptions are omitted.

Referring to FIG. 6, the serially connected drive circuit 20 in accordance with the fourth embodiment includes a first sensor/drive member 213, a second sensor/drive member 213a, a first motor coil 23 and a second motor coil 23a.

In comparison with the third embodiment, incorporating a sensor member into a drive member constitutes each of the sensor/drive members 213 and 213a of the fourth embodiment.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A brushless dc motor, comprising:
    a motor rotor having at least one magnet set;
    a motor stator having at least one pole set corresponding to the magnet set of the motor rotor;
    a first motor coil wound on the motor stator;
    a second motor coil wound on the motor stator and serially connected to the first motor coil;
    a first sensor/drive member connected to a power source to obtain a first voltage and to supply a second voltage, and further connected to the first motor coil, the first sensor/drive member conducts the first motor coil in full wave by the first voltage according to a first Hall signal detected by the first sensor/drive member; and
    a second sensor/drive member serially connected to the first sensor/drive member to obtain the second voltage, and further connected to the second motor coil, the second sensor/drive member is adapted to conduct the second motor coil in fill wave by the second voltage according to a second Hall signal detected by the second sensor/drive member;
    wherein the first sensor/drive member and the second sensor/drive member are commonly operated so that the first motor coil and the second motor coil are alternatively excited to thereby rotate the motor rotor.

2. The brushless dc motor as defined in claim 1, further comprising a circuit board attached to the stator; the first sensor/drive member and the second sensor/drive member are mounted to the circuit board.

3. The brushless dc motor as defined in claim 2, wherein in rotational operation, the magnetic phases detected by the first sensor/drive member and the second sensor/drive member relative to the motor rotor differ by 0 degrees, 90 degrees, 180 degrees, or 270 degrees.

4. The brushless dc motor as defined in claim 3, wherein when the detected magnetic phases differ by 90 degrees or 270 degrees, the first motor coil and the second motor coil are controlled to conduct in opposite directions so that the first motor coil and the second motor coil are excited in opposite directions.

5. The brushless dc motor as defined in claim 3, wherein when the detected magnetic phases differ by 0 degrees or 180 degrees, the first motor coil and the second motor coil are controlled to conduct in the same direction so that the first motor coil and the second motor coil are excited in the same direction.

6. The brushless dc motor as defined in claim 1, wherein each of the sensor/drive members can be substituted by a combination of a drive member and a sensor member.

* * * * *